(12) United States Patent
Luo

(10) Patent No.: US 11,615,384 B1
(45) Date of Patent: Mar. 28, 2023

(54) MANAGEMENT OF DECENTRALIZED COMMUNITY OF PRODUCT USERS BASED ON DISTRIBUTED LEDGER

(71) Applicant: JT INTERNATIONAL SA, Geneva (CH)

(72) Inventor: Jian Cheng Luo, Chemin des Coudriers (CH)

(73) Assignee: JT INTERNATIONAL SA, Geneva (CH)

( * ) Notice: Subject to any disclaimer, the term of this patent is extended or adjusted under 35 U.S.C. 154(b) by 0 days.

(21) Appl. No.: 17/545,161

(22) Filed: Dec. 8, 2021

(51) Int. Cl.
*G06Q 40/00* (2012.01)
*G06Q 20/06* (2012.01)

(52) U.S. Cl.
CPC .................. *G06Q 20/065* (2013.01)

(58) Field of Classification Search
CPC .................................................. G06Q 20/065
See application file for complete search history.

(56) References Cited

U.S. PATENT DOCUMENTS

| | | | | |
|---|---|---|---|---|
| 10,540,654 | B1* | 1/2020 | James | G06Q 20/223 |
| 10,726,388 | B2* | 7/2020 | Brodersen | G06Q 10/20 |
| 11,139,955 | B1* | 10/2021 | So | G06Q 20/3674 |
| 2017/0046806 | A1* | 2/2017 | Haldenby | G06Q 20/102 |
| 2017/0243286 | A1* | 8/2017 | Castinado | G06Q 40/00 |
| 2017/0243287 | A1* | 8/2017 | Johnsrud | G06Q 40/025 |
| 2019/0287175 | A1* | 9/2019 | Hill | G06Q 40/04 |
| 2020/0042960 | A1* | 2/2020 | Cook | H04L 9/3247 |
| 2020/0118110 | A1* | 4/2020 | Coverstone | G06Q 20/322 |
| 2020/0228342 | A1* | 7/2020 | Nixon | H04L 9/3236 |
| 2020/0273048 | A1* | 8/2020 | Andon | G06Q 20/045 |
| 2020/0380520 | A1* | 12/2020 | Kavali | G06Q 20/02 |
| 2020/0394471 | A1* | 12/2020 | Ganapavarapu | G06N 3/08 |
| 2021/0117408 | A1* | 4/2021 | Figueredo de Santana | G06F 16/27 |
| 2021/0217001 | A1* | 7/2021 | Harrison | G06Q 20/02 |
| 2021/0263909 | A1* | 8/2021 | Paracha | G06Q 10/0639 |
| 2021/0319441 | A1* | 10/2021 | Knobel | G06Q 20/36 |

FOREIGN PATENT DOCUMENTS

CA 3093054 A1 * 9/2020 ......... G06F 21/6254

OTHER PUBLICATIONS

Ramachandran et al: "Using Blockchain and smart contracts for secure data provenance management", The University of Texas at Dallas 800 W Campbell Rd Richardson, Texas 75080, Sep. 28, 2017 (Year: 2017).*

* cited by examiner

*Primary Examiner* — Edward J Baird
(74) *Attorney, Agent, or Firm* — Chip Law Group

(57) ABSTRACT

Provided is a system that receives tracking data associated with a user and including at least one information chosen from a group comprising purchase information of a product, usage information of this product, and cumulative sharing information related to this product or to a domain having any relation with this product. The system controls a distributed ledger technology network to execute a smart contract on the received tracking data by applying at least one rule on these received tracking data. The system assigns a status level chosen from at least two predefined status levels to the user based on the executed smart contract, at least one predefined status level corresponding to at least one privilege associated with a management of the distributed ledger technology network and/or the product. The system controls allocation of a first amount of electronic currency to the user based on his assigned status level.

12 Claims, 2 Drawing Sheets

MANAGEMENT OF DECENTRALIZED COMMUNITY OF PRODUCT USERS BASED ON DISTRIBUTED LEDGER

FIELD

The present disclosure relates generally to distributed ledger technology networks, and more particularly to allocation of amount(s) of electronic currency to users of products.

BACKGROUND

Generally, manufacturers of products and brands have databases of clients (or users) that have bought one or more of their products and to which they provide commercial offers, information relative to new products or new versions of products, and sometimes purchase coupons (or gift vouchers) corresponding to a discount on a next purchase. This can be provided by a regular mail or an email or a short message (or SMS) or else through an Internet site or even a social networking page. Sometimes clients (or users), registered in the database, are also encouraged or incited to sponsor another person in exchange for a purchase coupon (or gift voucher).

A client (or user) may also leave a message on the Internet site or the social networking page of a manufacturer (or brand) to express his satisfaction or dissatisfaction relative to a product or service.

So exchanges between manufacturers (or brands) and their clients are centralized and therefore limited (or constrained). This restricts possibilities for the manufacturers (or brands) to find new potential clients through their active clients and/or to provide a wider variety of commercial offers or possibilities of using purchase coupons (or gift vouchers). This restricts also possibilities for the clients that are loyal to a manufacturer (or brand) to get more important and/or more attractive and/or more frequent purchase coupons (or gift vouchers), and/or to have more possibilities of using their purchase coupons (or gift vouchers).

Moreover, because of the above mentioned centralization it appears to be difficult for a manufacturer (or brand) to estimate the effective influence on its sales of a client using several communication media, and therefore to provide clients with more interesting and/or more incentive and/or more general commercial offers and purchase coupons (or gift vouchers), in a transparent and trustless way. Accordingly, it would be beneficial to improve the situation, not only for manufacturers (or brands) but also for their clients and potential clients.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system, an electronic device and method for controlling allocation of amount(s) of electronic currency to users of products are provided substantially as shown in, and/or described in connection with, at least one of the figures, as set forth more completely in the claims.

The features, functions and advantages that have been discussed above and are described below in details can be achieved independently in various examples or may be combined in other examples. Further details of the examples can be seen with references to the following description and drawings.

BRIEF DESCRIPTION OF THE FIGURES

The novel features believed characteristics of the illustrative examples are set forth in the appended claims. The illustrative examples, however, as well as preferred modes of use, further objectives and descriptions thereof, will be better understood upon reading the following detailed description, which is given solely by way of non-limiting examples and which is made with reference to the appended drawings, wherein:

DETAILED DESCRIPTION

Figure 1:
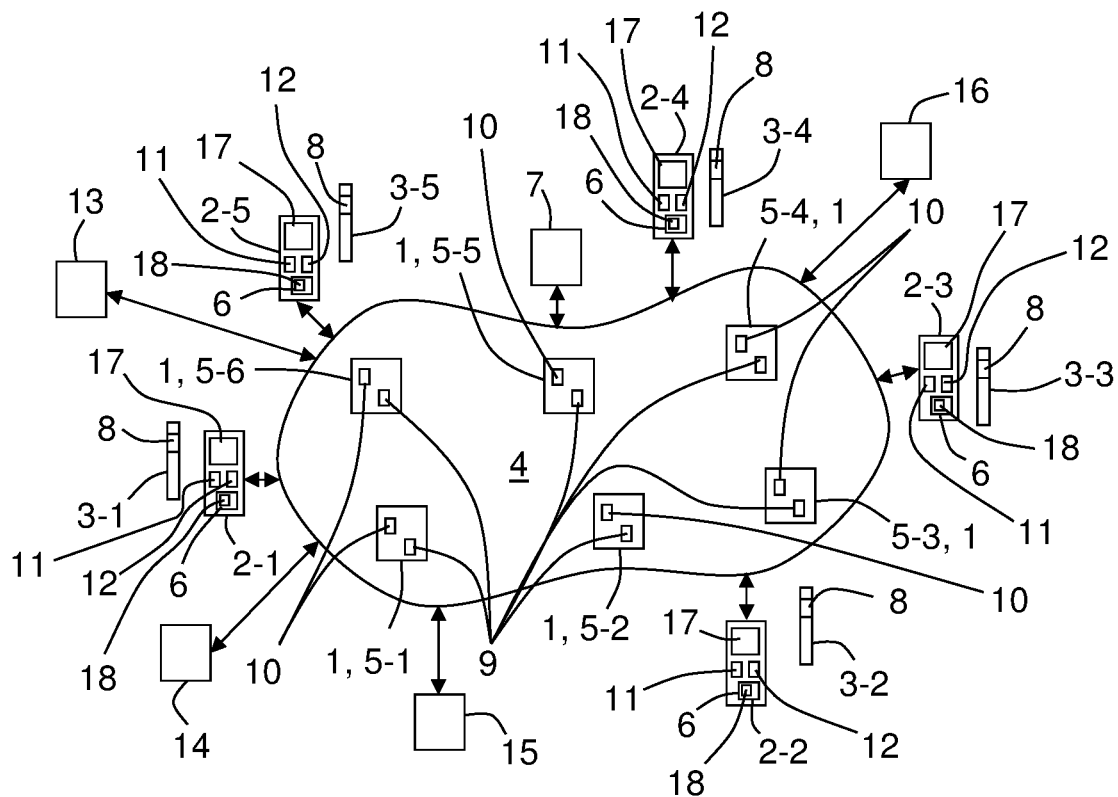
FIG. 1 schematically and functionally illustrates a distributed ledger technology network comprising an example a system according to an embodiment of the invention and to which are coupled user electronic devices according to another embodiment of the invention, associated respectively to purchased products, FIG. 2 schematically illustrates an example of algorithm implementing a method according to an embodiment of the invention, and FIG. 3 schematically illustrates an example of four operations implemented by a circuitry of an electronic device according to an embodiment of the invention.

The present description is directed notably to a system 1, and associated method and electronic device 2-$j$, intended for allowing a decentralized management of clients of manufacturers of products 3-$j$ via a distributed ledger technology network 4. In the following description the letter j associated to a reference numeral is used to designate the different electronic devices and products associated respectively to the different clients or users.

In the following description it will be considered that the products 3-$j$ are vaping devices, such as "E-vapor devices" or "T-vapor (or heat-not-burn) devices" producing an aerosol by heating an aerosol-forming substance mixed with air during a vaping session of their user. But a product 3-$j$ according to the invention could be of another type, as soon as it may be used by a user (or client) and registered in at least one database in correspondence with at least one identifier of its user. So, for instance, the product 3-$j$ could be an aerosol generation device, a tobacco delivery device, a nicotine delivery device, a tobacco and nicotine delivery device, a coffee or tea maker, a smartphone, an electronic tablet, a game console, a computer, a printer, a camera, or a vehicle.

A system 1 according to the invention is schematically illustrated in FIG. 1. It comprises at least a circuitry that is coupled to, or part of, a distributed ledger technology network 4.

In the following description it will be considered that the distributed ledger technology network 4 is a blockchain technology networks. But this is not mandatory. Indeed the distributed ledger technology network 4 needs only to be a decentralized peer-to-peer network in which consensus algorithms (and notably smart contracts) are running (or executed) to ensure replication and spread of data across multiple nodes and execution of agreements, without any central administrator and in a transparent and trustless way.

For instance, the blockchain may be Ethereum and may used Ethereum protocol upgrades (such as Ethereum 2.0 with EIP-1559).

Moreover in the following description it will be considered that the system 1 is a set of nodes 5-k of the distributed ledger technology network 4. But this is not mandatory. Indeed, it could be also a server of the distributed ledger technology network 4, for instance. In the non-limiting example illustrated in FIG. 1 the system 1 comprises six nodes 5-1 to 5-6 (k=1 to 6). But the number of nodes 5-k may take any value at least equal to one.

The circuitry of system 1 comprises at least a processor 9 and a memory 10 arranged for performing operations.

For instance, the (each) processor 9 may be a digital signal processor (or DSP), or an application specific integrated circuit (ASIC), or else a field programmable gate array (FPGA). More generally, the processor 9 may comprise integrated (or printed) circuits, or several integrated (or printed) circuits connected therebetween through wired or wireless connections. The term "integrated (or printed) circuits" refers here to any type of device capable of carrying out at least one electric or electronic operation.

Also for instance, the memory 10 may be a random access memory (or RAM). But it may be any type of device arranged for storing program instructions for the associated processor 9.

Generally speaking, the functions of the system circuitry may be carried out through the operation of program logic, through dedicated logic, through the interaction of program control and dedicated logic, or even partially manually (by the user). These functions may be provided through the use of dedicated hardware as well as hardware capable of executing software in association with appropriate software.

The system circuitry may also comprise, in addition with its processor(s) 9 and memory(ies) 10, an input interface, a mass memory (notably for storing intermediate data produced during its calculus and processing), and an output interface for delivering messages and instructions.

In the non-limiting example illustrated in FIG. 1 each node 5-k comprises a system circuitry (comprising at least a processor 9 and a memory 10). But this is not mandatory. Indeed, at least one node 5-k (possibly a dedicated one) could comprise a system circuitry (comprising at least a processor 9 and a memory 10).

The circuitry of system 1 is configured to carry out at least four operations 100-130 when new tracking data, associated with a user that has been previously registered, are generated.

For instance, such a registration may consists in creating a user account on an Internet website or social networking page of a manufacturer (or brand) selling products 3-j, before or after purchase of at least one such product 3-j and/or at least one other product that can be used by such a product 3-j. In the described example, the product 3-j may be a vaping device (such as a T-vapor device) and the other product that can be used with this T-vapor device 3-j may be a pack of refill units 8 (possibly tobacco sticks) that are manually introduced (at least partly) into the heating chamber of the T-vapor device 3-j by the user for a vaping session, for instance.

Also for instance, the registration data may comprise a user name and/or an address and/or a user identifier (identity card or passport) and/or a password and/or a date of birth and/or credit card information and/or a job definition and/or any other suitable identifier.

A first operation 100 of the (a) system circuitry consists in receiving tracking data associated with a registered user and including at least one information. Each information is chosen from a group comprising purchase information of a product 3-j, usage information of this product 3-j, and cumulative sharing information related to this product 3-j or to a domain having any relation with this product 3-j.

For instance, in an embodiment the circuitry may be configured to receive the tracking data from the purchased product 3-j itself (when it comprises a communication module and therefore is "connected"), or a communication device 2-j associated with the user, or else an application 6 executable on the purchased product 3-j or on this user communication device 2-j and possibly associated with a digital wallet. The user communication device 2-j may be a smartphone, an electronic tablet, a laptop, or a personal computer, for instance. When the application 6 is running in the user communication device 2-j, it may have been previously downloaded after the user registration.

In the non-limiting example illustrated in FIG. 1 five user communication devices 2-1 to 2-5 (j=1 to 5) are coupled to the distributed ledger technology network 4, and therefore to the system 1. But the number of user communication devices 2-j may take any value at least equal to one. Moreover, in the non-limiting example illustrated in FIG. 1 each user comprises one purchased product 3-j (j=1 to 5). But the number of purchased product 3-j used by a user may take any value at least equal to one.

Also for instance, in an embodiment the distributed ledger technology network 4 may be associated with an online community of product users, and each application 6 may control access to a content sharing platform 13 for this online community and/or to a social networking platform 14 for this online community and/or to an instant messaging platform 15 for this online community and/or to an electronic commerce platform 16 for this online community, and/or may provide a reference to a cryptocurrency exchange.

Also for instance, in an embodiment each application 6 may be configured for acquiring the purchase information of a product 3-j and/or the usage information and/or the cumulative sharing information. In this case, the acquired usage information may include at least one of the number of refill units 8 that have been consumed by the user with the purchased product 3-j, frequency of usage of this purchased product 3-j, method of usage of this purchased product 3-j, compliance of usage of this purchased product 3-j to at least one usage norm or regulation, and type of this purchased product 3-j.

In the described example, the method of usage of a purchased product 3-j (here a vaping device) may comprise the average duration of each vaping session and/or the number of puffs with each refill unit 8 and/or the number of troubleshootings with the purchased product 3-j or the corresponding refill units 8 and/or the taste and/or nicotine strength of the refill units 8 consumed with the purchased product 3-j. Also in the described example, the type of the purchased product 3-j may be chosen from E-vapor device, T-vapor device, a sub-class of E-vapor device, a sub-class of T-vapor device and any electric/electronic nicotine delivery system.

Also for instance, in an embodiment the cumulative sharing information may define at least one of publication of at least one content item related to a purchased product 3-j or to a domain having any relation with this purchased product 3-j, sharing of this published content item (through any communication media (email, SMS, Internet site, social network)), reaction(s) to this published content item, editing of this published content item, recommendation(s) of this purchased product 3-j or at least one subject of this domain, review(s) of this purchased product 3-j or at least one subject of this domain, follower(s) of this published content item, and subscriber(s) of this published content item.

Also for instance, in an embodiment the domain may concern any other product of the concerned manufacturer (or brand) having any relation with the purchased product 3-*j*, or any type of ambience corresponding to a usage of the purchased product 3-*j*, or any drink or food that can be associated with a usage of the purchased product 3-*j*, or any recommended location where it is possible to use the purchased product 3-*j*, or any travel (interesting places to visit, where to stay, show, concert) corresponding to a usage of the purchased product 3-*j*, or any recent hot topic, for instance related to a distributed ledger technology network or a currency exchange (such as blockchain or bitcoin).

A second operation 110 of the (a) system circuitry consists in controlling the distributed ledger technology network 4 to execute a smart contract on the received tracking data by applying at least one rule on these received tracking data.

A third operation 120 of the (a) system circuitry consists in assigning a status level chosen from at least two predefined status levels to the user based on this executed smart contract. At least one predefined status level corresponds to at least one privilege associated with a management of the distributed ledger technology network 4 and/or the concerned product 3-*j*.

A fourth operation 130 of the (a) system circuitry consists in controlling allocation of a first amount of electronic currency to the concerned user based on his assigned status level.

For instance, the electronic currency may be a digital token (or coin) associated with the distributed ledger technology network 4 and may be exchangeable for a fiat currency or a cryptocurrency or redeemable for a transaction on an integrated electronic commerce platform. In this example the electronic currency may be based on the Ethereum fungible token standard ERC-20, for instance.

Also for instance, the electronic currency can be created by (or for) the manufacturer of the product 3-*j*, and dedicated to any transaction between this manufacturer and its clients (or users) using its products, but also between its clients (or users) using its products and other authorized clients or other authorized manufacturers (or brands).

The allocation of a first amount of electronic currency (or tokens or coins) to the concerned user corresponds to a reward offered to this user by the concerned manufacturer (or brand) and corresponding to his assigned status level.

So, the invention allows generating an independent and decentralized entity comprising a group (or "club") of users (or clients) by means of an all-in-one decentralized application powered by its native electronic currency (or tokens or coins), in order the concerned manufacturer (or brand) could more easily recognize, reward and empower its loyal users (or clients). It allows also achieving greater transparency, faster transactions, cheaper transaction fees and potential capital appreciation deriving from native token's value appreciation. It allows also enhancing possibilities for the manufacturers (or brands) to find new potential clients through their active clients and to provide a wider variety of commercial offers or possibilities of using allocated first amounts of electronic currency (or tokens or coins).

As mentioned above each application 6 may be associated with a digital wallet intended for storing the allocated first amount of electronic currency (or tokens or coins). For instance, the creation of a user's digital wallet can require the generation of a seed phrase (preferably with a maximum of 24 alphanumeric characters to increase security). Also for instance, the user may be rewarded with a predefined amount of electronic currency (or tokens or coins) in his digital wallet, upon successful creation of the latter.

Also for instance, in an embodiment, each rule of a smart contract may be defined by (or for) the manufacturer of the purchased product 3-*j* and may be associated with at least one usage threshold and/or at least one activity threshold and/or at least one rule for verification of the received tracking data and/or at least one rule for the assignment of each predefined status level and/or at least one rule for the allocation of the electronic currency and/or information on eligibility criteria to join the distributed ledger technology network 4 and/or at least one rule for authentication of information of the user.

Also for instance, in an embodiment the system circuitry may be configured to compare usage of the purchased product 3-*j* defined by the usage information over a first predetermined time period with at least one usage threshold defined in the concerned smart contract. In this embodiment, the system circuitry is also configured to assign the status level to the user based on a result of this comparison. The first predetermined time period may be a month, a trimester, a semester, or a year, for instance.

In a non limitative example of embodiment, each usage threshold may be chosen from a group comprising at least a first usage threshold and a second usage threshold lower than this first usage threshold. In this embodiment, the system circuitry is configured to compare the usage of the concerned product 3-*j* (defined by the usage information) with the first and second usage thresholds. The system circuitry is also configured to assign either a first status level or a second status level of the predefined status levels to the concerned user depending at least on the result of the comparison between the product usage and at least the first and second usage thresholds. When the usage of the concerned product 3-*j* is greater than the first usage threshold the first status level may be assigned to the user and associated with at least a first privilege for participation in a management of the distributed ledger technology network 4. When the usage of the concerned product 3-*j* is smaller than or equal to the first usage threshold and greater than the second usage threshold, the second status level may be assigned to the user and associated with at least a second privilege for participation in an ideation activity and/or a testing activity (possibly of future products) associated with the purchased product 3-*j*.

For instance, the participation in the management of the distributed ledger technology network 4 may consists in an on-chain governance by voting (staking) once a year to decide on the future direction in areas of "tokenomics", "status rewards" and "using rewards". Here "tokenomics" refers to the study of how cryptocurrencies work within the broader ecosystem. This includes token distribution, supply and demand, as well as how tokens can be used to incentivize positive behaviour in the distributed ledger technology network 4.

The value of the allocated first amount of electronic currency (or tokens or coins) may depends on the assigned level status. For instance, a first value may be allocated to a user with an assigned first status level, and a second value smaller than the first value may be allocated to a user with an assigned second status level.

As an example, when the usage of the concerned product 3-*j* is quantified by the number of refill units 8 consumed with it, the first usage threshold may be comprised between 400 and 600, and the second usage threshold may be comprised between 200 and 400. For instance, the first usage threshold may be equal to 500, and the second usage threshold may be equal to 300.

In a non limitative example of embodiment, the first status level may be also associated with the second privilege, in order a user with an assigned first status level cumulates at least the first and second privileges.

But the number of predefined status levels may be greater than two. For instance, it may be equal to three or four. In the case where there are four predefined status levels the system circuitry may be configured to assign the first, second, third and fourth predefined status level depending on the result of the comparison between the product usage and the first and second usage thresholds and also a third usage threshold. When the usage of the concerned product 3-j is smaller than or equal to the second usage threshold and greater than the third usage threshold, the third status level may be assigned to the user and associated with a third value of allocated first amount of electronic currency (or tokens or coins) smaller than the second value. When the usage of the concerned product 3-j is smaller than the third usage threshold, the fourth status level may be assigned to the user and associated with a fourth value of allocated first amount of electronic currency (or tokens or coins) smaller than the third value.

Each value is added to the one stored in the user's digital wallet

The third and fourth status levels may be also associated to a third privilege. For instance, this third privilege may consists in being authorized to purchase chosen products of the concerned manufacturer (or brand) and/or other authorized products with the amount of electronic currency (or tokens or coins) stored in the user's digital wallet, and/or to hold on the electronic currency (or tokens or coins) stored in the user's digital wallet for a possible future appreciation, and/or to sell at least a part of the amount of electronic currency (or tokens or coins) stored in the user's digital wallet on a crypto exchange, for buying fiat or other crypto currencies.

In a non limitative example of embodiment, the first and second status levels may be also associated with the third privilege, in order a user with an assigned first status level cumulates the first, second and third privileges, and a user with an assigned second status level cumulates the second and third privileges.

In another non limitative example of embodiment, the system circuitry may be further configured to control allocation of a second amount of the electronic currency to the concerned user based on a participation in at least one of the management of the distributed ledger technology network 4, the ideation activity and the testing activity. For instance, a user with an assigned first status level may receive a first second amount of electronic currency (or tokens or coins) for voting because this appears to be incentive. In the same way, a user with an assigned first or second status level may possibly receive a second second amount of electronic currency (or tokens or coins) for participation in an ideation activity or a testing activity because this appears also to be incentive.

Each value of allocated second amount is added to the amount stored in the user's digital wallet.

Also for instance, in an embodiment the system circuitry may be further configured to compare at least one of the number of published content items, the number of published and shared content items, the number of reactions to the published content items, the number of comments in response to this published content items, the number of forwards of this published content items, the number of followers and the number of subscribers over a second predetermined time period with at least one activity threshold defined in the concerned smart contract. In this case, the system circuitry is also configured to assign the status level to the concerned user based on each result of a comparison to an activity threshold. For instance, the reactions can include "likes" and "emojis". Also for instance, the second predetermined time period may be a month, a trimester, a semester, or a year.

In the case where there are four predefined status levels the system circuitry may be configured to assign the first, second, third and fourth predefined status level depending on the result of the comparison between an above mentioned number (of "community sharings") and first, second and third activity thresholds. When an above mentioned number is greater than the first activity threshold, the first status level may be assigned to the user. When an above mentioned number is smaller than or equal to the first activity threshold and greater than the second activity threshold, the second status level may be assigned to the user. When an above mentioned number is smaller than or equal to the second activity threshold and greater than the third activity threshold, the third status level may be assigned to the user. When an above mentioned number is smaller than the third activity threshold, the fourth status level may be assigned to the user.

As an example, when the number concerns community sharings, the first activity threshold may be comprised between 20 and 30, the second activity threshold may be comprised between 10 and 20, and the third activity threshold may be comprised between 5 and 10. For instance, the first activity threshold may be equal to 24, the second activity threshold may be equal to 12, and the third activity threshold may be equal to 5. So, the system circuitry may assign the user status level based on the comparison of the usage of the purchased product 3-j over a first predetermined time period with at least one usage threshold, and/or based on a result of the comparison of at least one above mentioned number of community sharings over a second predetermined time period with at least one activity threshold. As an example, when there are four predefined status levels, first, second and third usage thresholds, first, second and third activity thresholds, the first status level may be assigned when the product usage is greater than 500 and the number of community sharings is at least equal to 25, the second status level may be assigned when the product usage is greater than 300 and smaller than 500 and the number of community sharings is at least equal to 13, the third status level may be assigned when the product usage is greater than 200 and smaller than 300 and the number of community sharings is at least equal to 6, and the fourth status level may be assigned when the product usage is smaller than 200 and the number of community sharings is smaller than 5.

Also for instance, the system circuitry may be configured to control at least one node operator 7 to verify the tracking data, and to control transfer of the verified tracking data to the distributed ledger technology network 4 for the execution of the concerned smart contract. It should be understood that when the verification indicates that the tracking data are incorrect, the system circuitry does not transfer them to the distributed ledger technology network 4 and therefore the execution of the concerned smart contract is not performed. Preferably, and as illustrated in the non-limitative example of FIG. 1, the node operator 7 does not belong to the distributed ledger technology network 4, but is coupled to the latter (4). This allows an off-chain verification and the use of a chainlink with the distributed ledger technology network 4 to transfer off-chain data to on-chain.

Figure 2:
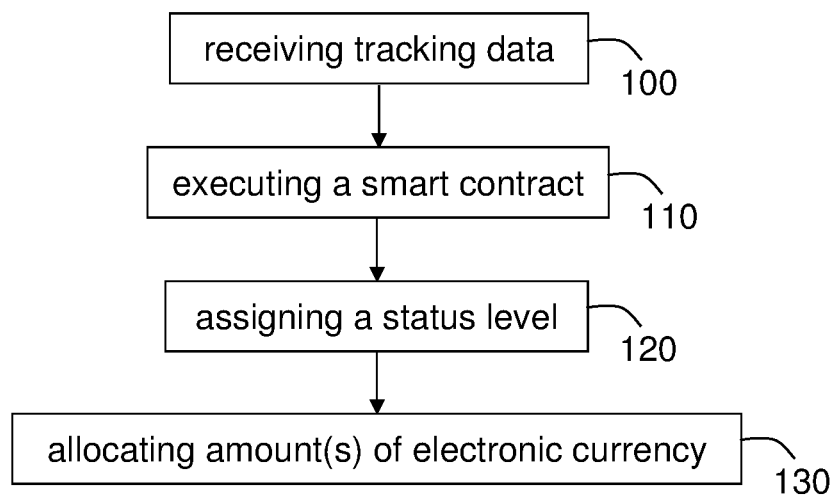

In an embodiment, the invention may also be considered as a method comprising at least four operations 100-130 as illustrated in the non-limitative example of algorithm of FIG. 2. Such a method may be implemented at least partly by the system 1 described above.

In a first operation 100 of this method, one receives tracking data associated with a user and including at least one information chosen from a group comprising purchase information of a product 3-*j*, usage information of this purchased product 3-*j*, and cumulative sharing information related to this purchased product 3-*j* or to a domain having any relation with this purchased product 3-*j*.

In a second operation 110 of the method, one controls the distributed ledger technology network 4 to execute a smart contract on the tracking data received in the first operation 100 by applying at least one rule on these received tracking data.

In a third operation 120 of the method, one assigns a status level chosen from at least two predefined status levels to the user based on the smart contract executed in the second operation 110, at least one predefined status level corresponding to at least one privilege associated with a management of the distributed ledger technology network 4 and/or the purchased product 3-*j*.

In a fourth operation 130 of the method, one controls allocation of an amount of electronic currency to the user based on the status level assigned in the third operation 120.

In another embodiment, the invention may also be considered as a non-transitory computer-readable medium having stored thereon computer-executable instructions which, when executed by at least one processor of a computing device (for instance belonging to a node 5-*k* of the distributed ledger technology network 4), cause this computing device to execute at least four operations 100-130 allowing implementing (or carrying out) the method described above.

A first operation 100 consists in receiving tracking data associated with a user and including at least one information chosen from a group comprising purchase information of a product, usage information of this purchased product 3-*j*, and cumulative sharing information related to this purchased product 3-*j* or to a domain having any relation with this purchased product 3-*j*.

A second operation 110 consists in controlling the distributed ledger technology network 4 to execute a smart contract on these received tracking data by applying at least one rule on these received tracking data.

A third operation 120 consists in assigning a status level chosen from at least two predefined status levels to the user based on this executed smart contract, at least one predefined status level corresponding to at least one privilege associated with a management of the distributed ledger technology network 4 and/or the purchased product 3-*j*.

A fourth operation 130 consists in controlling allocation of an amount of electronic currency to the user based on this assigned status level.

In another embodiment, the invention may also be considered as an electronic device 2-*j* or 3-*j* comprising a circuitry. As mentioned above, this electronic device 2-*j* or 3-*j* may be a communication device 2-*j* associated with a user, as illustrated in the non-limitative example of FIG. 1, or a purchased product 3-*j* comprising a communication module (and therefore connected).

The circuitry of this (each) electronic device 2-*j* or 3-*j* comprises at least a processor 11 and a memory 12 arranged for performing operations, and the application 6.

For instance, the (each) processor 11 may be a digital signal processor (or DSP), or an application specific integrated circuit (ASIC), or else a field programmable gate array (FPGA). More generally, the processor 11 may comprise integrated (or printed) circuits, or several integrated (or printed) circuits connected therebetween through wired or wireless connections.

Also for instance, the memory 12 may be a random access memory (or RAM). But it may be any type of device arranged for storing program instructions for the associated processor 11.

Generally speaking, the functions of the electronic device circuitry may be carried out through the operation of program logic, through dedicated logic, through the interaction of program control and dedicated logic, or even partially manually (by the user). These functions may be provided through the use of dedicated hardware as well as hardware capable of executing software in association with appropriate software.

The electronic device circuitry may also comprise, in addition with its processor(s) 11 and memory(ies) 12, an input interface, a mass memory (notably for storing intermediate data produced during its calculus and processing), and an output interface for delivering messages and instructions.

Figure 3:
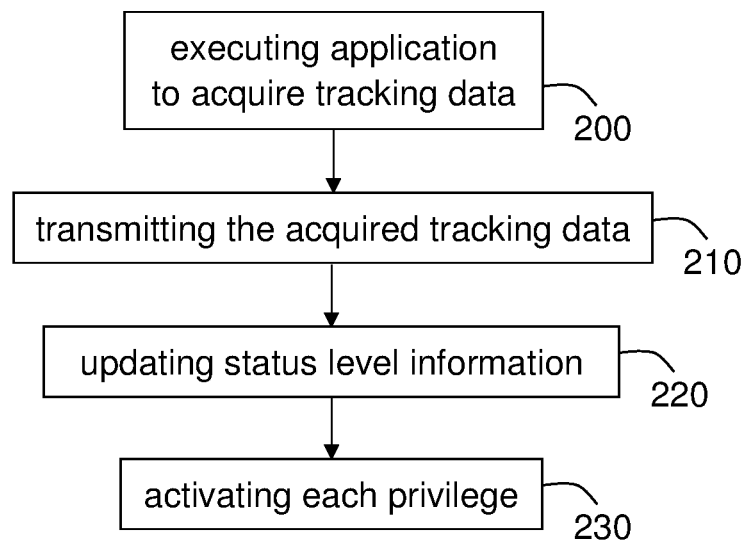

The circuitry of this (each) electronic device 2-*j* or 3-*j* is configured to carry out at least four operations 200-230, as illustrated in FIG. 3.

A first operation 200 consists in executing the application 6 associated with the distributed ledger technology network 4 to acquire tracking data associated with a user and including at least one information chosen from a group comprising purchase information of a product 3-*j*, usage information of this purchased product 3-*j*, and cumulative sharing information related to this purchased product 3-*j* or to a domain having any relation with this purchased product 3-*j*.

A second operation 210 consists in transmitting these acquired tracking data to the distributed ledger technology network 2.

A third operation 220 consists in updating information, representative of the assigned status level of the user (chosen from at least two predefined status levels) based on a verification of these acquired tracking data, in the application 6, at least one predefined status level corresponding to at least one privilege associated with a management of the distributed ledger technology network 4 and/or the purchased product 3-*j*.

A fourth operation 230 consists in activating each privilege of the user based on this updated information of the assigned user's status level, in order he could use it.

For instance, in an embodiment the circuitry of the electronic device 2-*j* or 3-*j* may be configured to receive electronic currency based on the updated information of the assigned user's status level, and to store this received electronic currency in a digital wallet associated with the concerned application 6.

For instance, in an embodiment, when the distributed ledger technology network 4 is associated with an online community of product users, the application 6 of the electronic device 2-*j* or 3-*j* may control access to a content sharing platform for this online community and/or to a social networking platform for this online community and/or to an instant messaging platform for this online community and/or to an electronic commerce platform for this online community, and/or may provide a reference to a cryptocurrency exchange.

In an example of embodiment, the application 6 of the electronic device 2-*j* or 3-*j* may be configured to acquire the usage information from a device associated with the user (for instance the purchased product 3-*j*) and the cumulative sharing information based on an activity on at least one of the platforms mentioned above. In this embodiment, the acquired usage information includes at least one of a number of refill units 8 that have been consumed by the user with the purchased product 3-*j*, frequency of usage of this purchased product 3-*j*, method of usage of this purchased product 3-*j*, compliance of usage of this purchased product 3-*j* to at least one usage norm or regulation, and type of this purchased product 3-*j*.

Also for instance, in an embodiment, the electronic device 2-*j* or 3-*j* may comprise a display screen 17, and its application 6 may also include a graphical user interface (or GUI) 18. In this embodiment the graphical user interface 18 is configured to control display by this screen 17 of the tracking data and menu items allowing to access at least one of a content sharing platform, an electronic commerce platform and an instant messaging platform. The graphical user interface 18 is also configured to receive user input to order the product 3-*j* or refill unit(s) 8 that can be used by this product 3-*j* or another product that can be used in association with this product 3-*j*, and/or to invite other user(s) to join the distributed ledger technology network 4, possibly with an incentive for the user and/or the other user(s), and/or to provide recommendation(s) to the other user(s) to earn a status level and/or exchange electronic currency, possibly with an incentive for the user (of the purchased product 3-*j*).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A system, comprising:
a plurality of nodes of a decentralized peer-to-peer network, at least one node of said plurality of nodes comprising circuitry configured to:
receive tracking data associated with a user from a device associated with said user, wherein said tracking data includes at least one of purchase information of a product, usage information of said product, cumulative sharing information related to said product, or cumulative sharing information related to a domain having a relation with said product;
transmit said received tracking data to at least one node operator associated with said decentralized peer-to-peer network to verify said received tracking data, wherein
said at least one node operator is external to said decentralized peer-to-peer network,
said at least one node operator is coupled to said decentralized peer-to-peer network via a chainlink, and
said verification comprises an off-chain verification of said tracking data by said at least one node operator;
transfer, via said chainlink, said verified tracking data from said at least one node operator to said decentralized peer-to-peer network as on-chain data subsequent to said off-chain verification;
control execution of a smart contract on said verified tracking data, wherein
said execution of said smart contract comprises execution of at least one algorithm for replication of said verified tracking data across said plurality of nodes of said decentralized peer-to-peer network,
said smart contract comprises a plurality of rules, and
said plurality of rules comprises a first rule for said verification of said received tracking data;
compare a usage of said product over a first predetermined time period with at least one usage threshold based on said execution of said smart contract, wherein
said usage of said product is defined by said usage information, and
said at least one usage threshold is defined in said smart contract;
assign a status level chosen from at least two predefined status levels to said user based on a result of said comparison, wherein
at least one predefined status level corresponding to at least one privilege associated with at least one of a management of said decentralized peer-to-peer network or said product, and
said plurality of rules comprises a second rule for assigning each predefined status level of said at least two predefined status levels; and
transfer a first amount of an electronic currency to a digital wallet associated with said user based on said assigned status level, wherein
said electronic currency is one of a token or a coin, and
said plurality of rules comprises a third rule for said transfer of said electronic currency.

2. The system according to claim 1, wherein
said circuitry is further configured to receive said tracking data from at least one of said product, said device associated with said user, an application executable on said product, or said application executable on said device, and
said application is associated with said digital wallet that stores said first amount of said electronic currency.

3. The system according to claim 2, wherein, when said decentralized peer-to-peer network is associated with an online community of product users, said application is configured to control access to at least one of a content sharing platform for said online community, a social networking platform for said online community, an instant messaging platform for said online community, an electronic commerce platform for said online community, or provide a reference to a cryptocurrency exchange.

4. The system according to claim 2, wherein
said application is configured to acquire at least one of said purchase information, said usage information, or said cumulative sharing information related to said product, and
said usage information includes at least one of a number of refill units that have been consumed by said user with said product, a frequency of usage of said product, a method of usage of said product, compliance of usage of said product to at least one usage norm or regulation, or a type of said product.

5. The system according to claim 1, wherein
each usage threshold is chosen from a group comprising a first usage threshold and a second usage threshold lower than said first usage threshold, and
said circuitry is further configured to:
compare said usage of said product defined by said usage information with said first usage threshold and said second usage threshold, and
assign one of a first status level of said at least two predefined status levels to said user when said usage of said product is greater than said first usage threshold, said first status level being associated with a first privilege for participation in a said management of said decentralized peer-to-peer network, or a second status level of said at least two predefined status levels to said user when said usage of said product is smaller than or equal to said first usage threshold and greater than said second usage threshold, said second status level being associated with a second privilege for participation in a testing activity associated with said product.

6. The system according to claim 5, wherein said first status level is also associated with said second privilege.

7. The system according to claim 5, wherein said circuitry is further configured to control transfer of a second amount of said electronic currency to said user based on said participation in at least one of said management of said decentralized peer-to-peer network, or said testing activity.

8. The system according to claim 1, wherein
said cumulative sharing information related to said domain having said relation with said product defines at least one of publication of at least one content item related to said product or said domain having said relation with said product, sharing of said published at least one content item, reactions to said published at least one content item, editing of said published at least one content item, recommendations of said product or at least one subject of said domain, reviews of said product or at least one subject of said domain, followers of said published at least one content item or subscribers of said published at least one content item, and wherein
said circuitry is further configured to:
compare at least one of a number of published content items, a number of published and shared content items, a number of reactions to said published content items, a number of comments in response to said published content items, a number of forwards of said published content items, a number of followers and a number of subscribers over a second predetermined time period with at least one activity threshold defined in said smart contract; and
assign said status level to said user based on each result of a comparison to an activity threshold.

9. The system according to claim 1, wherein said electronic currency is a digital token associated with said decentralized peer-to-peer network and said electronic currency is switched for at least one of a fiat currency, a cryptocurrency, or redeemable for a transaction on an integrated electronic commerce platform.

10. The system according to claim 1, wherein each rule of said smart contract is defined by a manufacturer of said product and is associated with at least one of a usage threshold, an activity threshold, said first rule for said verification of said tracking data, said second rule for said assignment of each predefined status level, information on eligibility criteria to join said decentralized peer-to-peer network, or a rule for authentication of information of said user.

11. A method, comprising:
in a system comprising a plurality of nodes of a decentralized peer-to-peer network:
receiving tracking data associated with a user from a device associated with said user, wherein said tracking data includes at least one of purchase information of a product, usage information of said product, cumulative sharing information related to said product, or cumulative sharing information related to a domain having a relation with said product;
transmitting said received tracking data to at least one node operator associated with said decentralized peer-to-peer network to verify said received tracking data, wherein
said at least one node operator is external to said decentralized peer-to-peer network,
said at least one node operator is coupled to said decentralized peer-to-peer network via a chainlink, and
said verification comprises an off-chain verification of said tracking data by said at least one node operator;
transferring, via said chainlink, said verified tracking data from said at least one node operator to said decentralized peer-to-peer network as on-chain data subsequent to said off-chain verification;
controlling execution of a smart contract on said verified tracking data, wherein
said execution of said smart contract comprises execution of at least one algorithm for replication of said verified tracking data across said plurality of nodes of said decentralized peer-to-peer network,
said smart contract comprises a plurality of rules, and
said plurality of rules comprises a first rule for said verification of said received tracking data;
comparing a usage of said product over a first predetermined time period with at least one usage threshold based on said execution of said smart contract, wherein
said usage of said product is defined by said usage information, and
said at least one usage threshold is defined in said smart contract;
assigning a status level chosen from at least two predefined status levels to said user based on a result of said comparison, wherein
at least one predefined status level corresponding to at least one privilege associated with at least one of a management of said decentralized peer-to-peer network or said product, and
said plurality of rules comprises a second rule for assigning each predefined status level of said at least two predefined status levels; and
transferring an amount of an electronic currency to a digital wallet associated with said user based on said assigned status level, wherein
said electronic currency is one of a token or a coin, and
said plurality of rules comprises a third rule for said transfer of said electronic currency.

12. A non-transitory computer-readable medium having stored thereon computer-executable instructions which, when executed by at least one processor of a computing device, cause said computing device to execute operations, said operations comprising:

in a system comprising a plurality of nodes of a decentralized peer-to-peer network:
receiving tracking data associated with a user from a device associated with said user, wherein said tracking data includes at least one of purchase information of a product, usage information of said product, cumulative sharing information related to said product, or cumulative sharing information related to a domain having a relation with said product;
transmitting said received tracking data to at least one node operator associated with said decentralized peer-to-peer network to verify said received tracking data, wherein
    said at least one node operator is external to said decentralized peer-to-peer network,
    said at least one node operator is coupled to said decentralized peer-to-peer network via a chainlink, and
    said verification comprises an off-chain verification of said tracking data by said at least one node operator;
transferring, via said chainlink, said verified tracking data from said at least one node operator to said decentralized peer-to-peer network as on-chain data subsequent to said off-chain verification;
controlling execution of a smart contract on said verified tracking data, wherein
    said execution of said smart contract comprises execution of at least one algorithm for replication of said verified tracking data across said plurality of nodes of said decentralized peer-to-peer network,
    said smart contract comprises a plurality of rules,
    said plurality of rules comprises a first rule for said verification of said received tracking data;
comparing a usage of said product over a first predetermined time period with at least one usage threshold based on said execution of said smart contract, wherein
    said usage of said product is defined by said usage information, and
    said at least one usage threshold is defined in said smart contract;
assigning a status level chosen from at least two predefined status levels to said user based on a result of said comparison, wherein
    at least one predefined status level corresponding to at least one privilege associated with at least one of a management of said decentralized peer-to-peer network or said product, and
    said plurality of rules comprises a second rule for assigning each predefined status level of said at least two predefined status levels; and
transferring an amount of an electronic currency to a digital wallet associated with said user based on said assigned status level, wherein
    said electronic currency is one of a token or a coin, and
    said plurality of rules comprises a third rule for said transfer of said electronic currency.

* * * * *